(No Model.)

W. MORGAN.
MACHINE ROLLER CHAIN.

No. 329,407. Patented Oct. 27, 1885.

WITNESSES
Henry Skerrett
Miles E. Hughes
both of Birmingham

INVENTOR
William Morgan

UNITED STATES PATENT OFFICE.

WILLIAM MORGAN, OF BIRMINGHAM, COUNTY OF WARWICK, ENGLAND.

MACHINE-ROLLER CHAIN.

SPECIFICATION forming part of Letters Patent No. 329,407, dated October 27, 1885.

Application filed February 18, 1885. Serial No. 156,258. (No model.) Patented in England March 13, 1883, No. 1,352.

*To all whom it may concern:*

Be it known that I, WILLIAM MORGAN, a subject of the Queen of Great Britain, residing at 21 Cannon Street, Birmingham, in the county of Warwick, England, manufacturer, have invented Improvements in Machine-Roller Chains for Driving and Communicating Motion, (for which I have received Letters Patent in Great Britain, No. 1,352, dated March 13, 1883,) of which the following is a specification.

This invention consists in constructing chains for the transmission of motion or force by employing a series of long links cylindrical in cross-section, with perfectly square or rectangular inner sides or edges, the transverse ends of the adjacent links being connected by hollow rollers, which, when combined with the said links, form rolling curves or surfaces, which considerably lessen the friction between the moving parts, thus transmitting motion by rolling contact.

Figure 1:
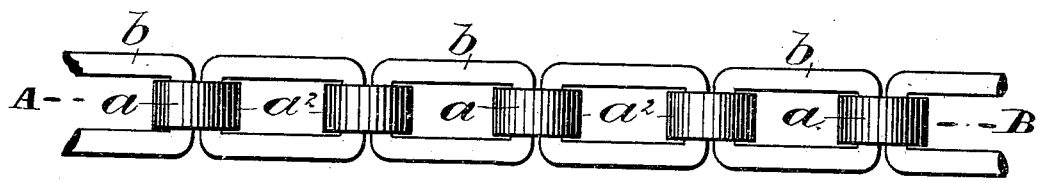
Figure 2:
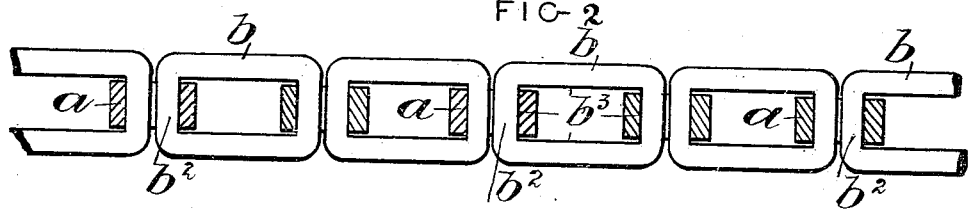
Figure 3:
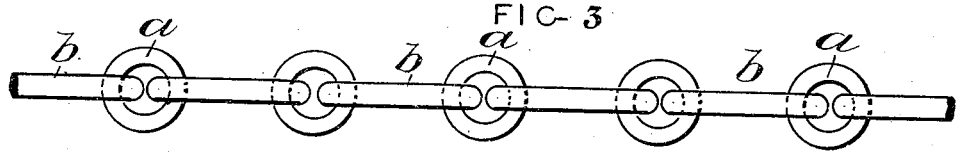
Figure 4:
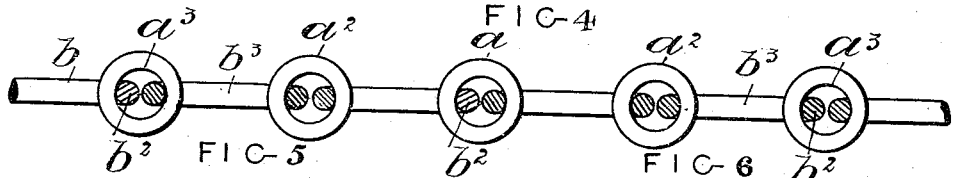
Figures 5, 6:
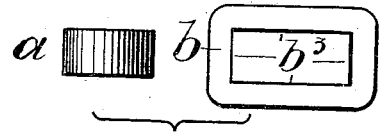

Figure 1 shows a plan of machine-roller chain or chain-gearing constructed according to my invention for driving or communicating motion or force for various purposes. Fig. 2 is a longitudinal section through the rollers, and Fig. 3 is a side elevation of Fig. 1. Fig. 4 is a longitudinal vertical section through the links on the dotted lines A B. Fig. 5 is a plan and edge view of one of the roller-links. Fig. 6 shows a roller-link and a connecting-link separately. In Fig. 5 the roller-link is made solid.

The same letters of reference indicate the same parts in Figs. 1, 2, 3, 4, and 5.

$a$ $a$ are hollow rollers, connecting the adjacent or contiguous long links $b$ $b$, and when constructed and combined as represented they form a continuous length of chain for communicating or transmitting motion or force from the peripheries of wheels or drums by rolling contact. The space or figure of the inside edges of the connecting-links are squared or form perfect rectangles for the free rotation of the connecting roller-links. The hollow rollers embracing the respective adjacent transverse ends of the said links are cylindrical in cross-section, and when moving against the inside concave surface of the rollers form rolling curves, so that on the chain traveling and taking upon properly-shaped teeth or projections on wheel-peripheries the acting surfaces of the chain roll freely and smoothly in its course of travel, so that the roller-links $a$ $a$ constitute rolling surfaces, and when in contact with wheel-teeth roll externally upon the peripheries $a^2$ $a^2$ and internally, $a^3$ $a^3$, upon the cylindrical transverse ends $b^2$ $b^2$ of the transverse links $b$. Chains so constructed travel and transmit motion by the contact of rolling curves. The motion resulting from the mutual action of the parts in contact produces no irregular wearing of the chain, as the chain travels freely and uniformly over the chain-wheels. The rectangular sides or openings of the links $b$ are marked $b^3$.

I claim as my invention—

A drive-chain consisting of a series of open rectangular links coupled together by tubular rollers surrounding the end bars of each link, and adapted to receive the frictional contact of the chain when in use, said rollers forming the sole connections between the links, substantially as shown and described.

WILLIAM MORGAN.

Witnesses:
 HENRY SKERRETT,
 MILES E. HUGHES.
  *Both of Birmingham.*